United States Patent
Berger et al.

(10) Patent No.: US 6,933,335 B1
(45) Date of Patent: Aug. 23, 2005

(54) THERMOPLASTIC POLYMER BLEND PRODUCED FROM THERMOPLASTIC STARCH AND METHOD FOR THE PRODUCTION THEREOF

(75) Inventors: Werner Berger, Dresden (DE); Lutz Jeromin, Hilden (DE); Guntram Opitz, Dresden (DE)

(73) Assignee: Biop Biopolymer Technologies AG, Dresden (DE)

( * ) Notice: Subject to any disclaimer, the term of this patent is extended or adjusted under 35 U.S.C. 154(b) by 225 days.

(21) Appl. No.: 10/049,482

(22) PCT Filed: Aug. 5, 2000

(86) PCT No.: PCT/DE00/02661

§ 371 (c)(1),
(2), (4) Date: Jul. 30, 2002

(87) PCT Pub. No.: WO01/10949

PCT Pub. Date: Feb. 15, 2001

(30) Foreign Application Priority Data

Aug. 6, 1999 (DE) .......................... 199 38 672

(51) Int. Cl.⁷ .............................. C08L 3/00; C08L 89/00
(52) U.S. Cl. ............................. 524/47; 524/52; 524/53
(58) Field of Search ................... 524/47, 48, 49–53

(56) References Cited

U.S. PATENT DOCUMENTS

| | | | | |
|---|---|---|---|---|
| 3,949,145 A | * | 4/1976 | Otey et al. ................ | 428/424.6 |
| 5,382,611 A | * | 1/1995 | Stepto et al. .................. | 524/47 |
| 5,439,953 A | * | 8/1995 | Ritter et al. .................. | 524/47 |
| 6,231,970 B1 | * | 5/2001 | Andersen et al. ........... | 428/332 |

FOREIGN PATENT DOCUMENTS

EP 0404723 * 12/1990

* cited by examiner

*Primary Examiner*—James J. Seidleck
*Assistant Examiner*—U. K. Rajguru
(74) *Attorney, Agent, or Firm*—Gudrun E. Hucket

(57) ABSTRACT

A thermoplastic polymer blend of a bi-continuous phase structure contains thermoplastic starch, at least one synthetic polymer, and a hydrolysis component on PVAc basis. The starch component of the polymer blend has a molecular weight which is only minimally reduced relative to native starch. The thermoplastic polymer blend is produced by reactive extrusion of a mixture of native starch and at feast one hydrophobic polymer with addition of a hydrolyzed component on polyvinyl acetate basis and of lower polyfunctional alcohols and water in the presence of an acidic catalyst. The thermoplastic polymer blend is used for producing injection molded, deep-drawn, or blow-molded parts, foils or raw materials for fibers as well as material for melt film coatings.

18 Claims, No Drawings

THERMOPLASTIC POLYMER BLEND PRODUCED FROM THERMOPLASTIC STARCH AND METHOD FOR THE PRODUCTION THEREOF

BACKGROUND OF THE INVENTION

1. Field of the Invention

The invention relates to a thermoplastic polymer blend comprising thermoplastic starch as well as a method for producing a thermoplastically deformable, biologically degradable polymer blend, that is shape-resistant in water, on the basis of native starch, synthetic polymers, for example, aliphatic polyesters and their copolymers, polyvinyl acetate (PVAc), polyvinyl alcohol (PVOH) and other, preferably biologically degradable synthetic polymers with addition of a hydrolysis component on the basis of PVAc as well as water or/and lower polyfunctional alcohols by reactive extrusion, preferably in double screw extruders. The reaction product can be processed as a function of the product composition by means of conventional processing machines for thermoplastics to injection molded, deep-drawn, and blow molded parts as well as foils with adjustable service value properties, for example, shape resistance in water and biological degradability. The polymer blend according to the invention is also used as a raw material for fibers as well as material for melt film coatings.

2. Description of the Related Art

In recent years, several methods for manufacturing and forming thermoplastic starch (TPS), alone or in the form of a polymer mixture or polymer melt or polymer blend, have become known. This research has been carried out with the goal of making available new or broader fields of application for renewable raw materials.

It is known to hydrolyze the grainy structure of native starch first with defined proportions of water or/and lower polyfunctional alcohols, such as ethylene glycol, propylene glycol, glycerol, 1,3-butanediol, diglyceride, corresponding ethers, but also components such as dimethylsulfoxide, dimethylformamide, dimethylurea, dimethyl acetamide and/or other additives to a thermoplastic material by thermo-mechanical hydrolysis in conventional double screw extruders.

The service value properties of the extruded starch material and of the products produced therefrom is minimal. In particular, the material is very hydrophilic, ages during storage, and exhibits processing problems. For this reason, synthetically obtained water-resistant polymers, such as, for example, polyethylene, polypropylene, or aliphatic co-polyesters, aliphatic-aromatic co-polyesters, polyester amides, polyester urethanes, water-resistant starch/cellulose derivatives and/or other mixtures are added to the starch. However, this causes the problem that the compatibility among the polymer components is unsatisfactory. Moreover, the biological degradability and also the cost structure become less favorable.

The current state of the art is documented extensively in the form of printed materials. Reference is being had in this connection to the publication by R. F. T Stepto et al. "Injection Molding of Natural Hydrophilic Polymers in the Presence of Water" Chimia 41 (1987) No. 3, pp. 76–81, and the literature cited therein as well as, in an exemplary fashion, to the patents DE 4116404, EP 0327505, DE 4038732, U.S. Pat. No. 5,106,890, U.S. Pat. No. 5,439,953, DE 4117628, WO 94/04600, DE 4209095, DE 4122212, EP 0404723, or EP 407350.

In DE 40 32 732 the starch, plasticized with water and glycerol, is processed primarily with polyvinyl acetate to a polymer mixture in an extruder. The extruded material has an improved water resistance in comparison to TPS. With a higher starch proportion the extruded material and the bottles produced therefrom turn yellow to brownish. The amount of starch is thus limited to less than 50%.

A neutral to slightly acidic component of polyvinyl acetate and water glass has also been suggested already (DE 195 33 800) with which a polymer mixture of starch and a hydrophobic polymer, for example, polyvinyl acetate, can be extruded. The component is produced of water glass and polyvinyl acetate during the extrusion process with intensive mixing action. Optionally, acetic acid is added in order to neutralize not yet reacted water glass after saponification of PVAc with water glass. It was found that already minimal additions of this component results in a significant quality improvement of the extruded material and of the products produced thereof. Significantly more native starch can be used in comparison to the prior art without discoloration or with only minimal discoloration while maintaining or improving the shape resistance in water. Apparently, the component contributes to making the two phases, i.e., the hydrophilic thermoplastic starch and the hydrophobic polymer which, in fact, are immiscible, miscible to a certain degree.

Further experiments have shown that the quality of the end product with respect to shape stability in water and strength must be improved even further. In particular, it was impossible to produce thin foils under approximately 300 $\mu$m thickness.

It has already been suggested (DE 197 50 846) to produce a component of polyvinyl acetate and alkali water glass and to extrude this component together with starch and a hydrophobic polymer, for example, polyvinyl acetate, to a high-quality polymer mixture. For producing the component, polyvinyl acetate was saponified to a hydrolyzation degree of up to 90% in the presence of catalytic amounts of low-molecular organic mono-, di- and trihydroxy components (for example, methanol, ethanol, ethylene glycol, glycerin) and with continuous addition of alkaline-reacting components and of the alkali silicate in a batch process.

It was found that with this component, which obviously acts as a compatibility agent, polymer mixtures with high starch proportions can be extruded in analogy to DE 195 33 800. The products produced of this polymer mixtures have a significantly greater quality in regard to several parameters. In particular, foils of a thickness of less than 100 $\mu$m can be produced.

SUMMARY OF THE INVENTION

Based on the ecological goals of employing renewable raw materials to an even greater extent and to economically produce environmentally safe products, it is an object of the invention to provide a polymer blend on the basis of thermoplastic starch with improved properties.

According to the invention this object is solved by a thermoplastic polymer blend with a bi-continuous phase structure of thermoplastic starch, at least one synthetic polymer, and a hydrolysis component based on PVAc, wherein the starch component of the polymer blend has a molecular weight which is only minimally reduced relative to native starch.

The thermoplastic polymer blend is produced according to the invention such that a mixture of native starch and at least one hydrophobic polymer is extruded with addition of a hydrolyzed component on the basis of polyvinyl acetate and of lower polyfunctional alcohols or/and water in the presence of an acidic catalyst.

The acidic catalyst can be an organometallic compound, such as dibutyl tin oxide, dibutyl tin dilaurate, tetra-2-ethylhexyl titanate, triethanolamine zirkonate, titanate compound chelated with lactic acid, triethanolamine titanate, or/and alkyl titanate, Lewis acid (for example, triphenyl phosphite) or acids, such as nitric acid, sulfuric acid, hydrochloric acid or/and p-toluene sulfonic acid.

It was found that the addition of only a small amount of one or several of the aforementioned acidic catalysts apparently enhances the quickly occurring transesterification or cross-linking reaction of starch, hydrolysis component on the basis of PVAc and polymer and synthetic polymer in the presence of water. By means of this reaction, which occurs against all expectations in the shearing field of the extruder, it is possible to carry out processing with relatively large amounts of moisture in the mixture. A prior energy-intensive drying is not required. Moreover, it was found that the addition of the catalyst allows adjustment of the rheologic properties of the mixture within certain limits. Accordingly, the adjustment of the viscosity of the polymers can be improved. It is possible to adjust excellent reproducible processing conditions within the extruder.

With the processing conditions according to the invention, it is possible to adjust a bi-continuous phase morphology of the system and to keep it stable. FIG. 1 shows a microscope image (phase contrast microscope) of TPS-Bionolle blends produced according to the invention. The bi-continuity of the dark and light phases which remains stable can be seen.

The bi-continuous phase morphology of the polymer blend according to the invention has a broader variety in regard to the property profile (for example, greater proportions of starch, improved biological degradability, adjustment of the permeation properties) than systems with insular/matrix structures (see L. A. Utracki, Polymer Alloys and Blends: Thermodynamics and Theology, Munich, Vienna, New York, Hanser Publishers 1989 or Handbuch der technischen Polymerchemie, VCH Verlag Chemie, Weinheim, New York, Basel, Cambridge, Tokyo). Transparent films are possible with very fine dispersions (particle diameters<100 nm) with which an expansive phase separation does not occur. The bi-continuous phase structure has also the advantage that the hydrophobic properties of the synthetic polymer component even for a relatively minimal proportion within the total mixture are imparted to the material as a whole. At the same time, the properties of the thermoplastic starch, such as high mechanical strength, minimal oxygen permeability, quick biological degradability, remain intact.

A PVAc component which has been partially saponified to a saponification degree of preferably 30 to 55% has also a significant effect on the phase stability of the polymer mixture. Particularly for the manufacture of thin foils it is recommended to saponify an aqueous PVAc dispersion with NaOH at 120 to 140° C. and to adjust a residual moisture contents of 15–35% by means of subsequent centrifugation, with removal of by-products as much as possible. A higher residual moisture contents increases water absorption of the polymer mixture.

For different polymer mixtures according to the invention (for example, according to examples 8 and 11 of the table attached at the end of the examples), a MFI (melt flow index) of approximately 5 G7 10 min. at a temperature 130° C. and a load of 5 kg was measured. This value indicates a good rheologic compatibility of the components and phase stability of the system.

The flow behavior of the melt of the polymer blend according to the invention approximates that of pure polymer melts. Surprisingly, it was found that the polymer blends according to the invention at 130° C. have a higher melt viscosity then mixtures which have been produced without catalyst. This is seen as an indication of the change of the molecular structure toward a greater homogeneity of the polymer blends according to the invention. Despite the presence of water and the acidic medium a molecular weight reduction of the starch takes place only to a minimal extent.

For this purpose, the molecular weight Mw of the starch components of thermoplastic starch (TPS) and different polymer mixtures with TPS is measured after extraction with DMSO via GPC-MALLS and compared with the molecular weight of native potato starch as well as with a commercially available starch blend "MaterBi" produced by the company Novamont.

| No. | TPS or polymer mixture | Mw in $10^6$ g/mol |
|---|---|---|
| 1 | TPS | 13.2 |
| 2 | TPS + catalyst (0.1% $HNO_3$) | 4.0 |
| 3 | TPS + catalyst (0.15% $HNO_3$) | 1.4 |
| 4 | TPS + partially saponified PVAc (appr. 1:1) | 24.9 |
| 5 | TPS + partially saponified PVAc (appr. 1:1) + catalyst (0.1% $HNO_3$) | 25.2 |
| 6 | TPS + partially saponified PVAc + Bionolle (appr. 1/3:1/3:1/3) + catalyst (0.1% $HNO_3$) | 23.7 |
| 7 | native potato starch | 40 |
| 8 | MaterBi | 0.4 |

As can be easily seen when comparing the values 1, 2 and 3, the catalyst has a negative effect on the molecular weight. It decreases the molecular weight of TPS greatly. On the other hand, the values 1 and 4 show that the hydrolysis component on PVAc basis increases the molecular weight in the mixture with TPS. In this mixture, the acidic catalyst no longer reduces the molecular weight (value 5). Apparently, the hydrolyzed component acts as a compatibility agent. An effect which must be based on the particular properties of the hydrolyzed component because the molecular weight is not further increased by addition of an additional further synthetic component, for example, Bionolle (aliphatic co-polyester produced by the company Showa Denko, poly(butylene succinate-co-adipate) (value 6). In the combination with the compatibility agent the above-mentioned advantageous effects of the acidic catalyst can be employed without disadvantages regarding a too great reduction of the molecular weight. As will be demonstrated in the following by means of examples, the foils extruded from the polymer mixtures have excellent strength values. When comparing the values, in particular 2, 4, and 5, a synergistic effect can even be seen in regard to the acidic catalyst and the compatibility agent.

As a polymer component different aliphatic polyesters and their copolymers, polyvinyl acetate (PVAc) and their copolymers, polyvinyl alcohols (PVOH) and their copolymers, water-resistant starch and cellulose derivatives as well as other, preferably biologically degradable, synthetic polymers can be used.

Apparently, the combination of additives of acidic catalyst and hydrolyzed PVAc component is also the reason that, on the one hand, as demonstrated in detail with the examples, very thin foils can be drawn from the polymer mixture and, on the other hand, a high starch proportion can be admixed to the mixtures for injection molded products. Well-suited granular materials for injection molding have been produced of 65–75% starch, 5–10% compatibility agent, the acidic catalyst as well as remainder Bionolle.

The native starch, the hydrolyzed component on PVAc basis, and the catalyst can be mixed to an easy-flowing powder mixture. However, it is also possible to meter the catalyst in the liquid state, mixed with glycerin or another polyfunctional alcohol.

The powder mixture for improving its flowability should preferably have added thereto approximately 1% silica gel. With a preferred addition of approximately 1% stearic acid to the powder mixture the processability in the extruder is improved.

Depending on the application of the granular material, the proportions of starch as well as of the compatibility agent and the synthetic polymer vary.

DESCRIPTION OF PREFERRED EMBODIMENTS

The invention will be explained in the following with the aid of several examples.

In the attached table the formulations and the results of several examples are compiled. The effect of the catalyst and specifically the catalyst action in combination with the hydrolyzed component on PVAc basis is to be demonstrated by comparison.

All examples have in common that native starch with 16 to 20% moisture content and the hydrolyzed component together with approximately 1% stearic acid and silica gel, respectively, are mixed in a quick mixing device to an easy-flowing powder mixture. This powder mixture, and Bionolle as well as glycerin via separate metering devices, is introduced into a double screw extruder with tightly meshing screws rotating in the same direction (manufacturer Berstorff ZE25, UD=32). The total mass throughput is 2.5 kg per hour. The temperature profile along the extrusion stretch ensures that the extruded material is heated by thermal and mechanical energy introduction to at least 180° C. and is subsequently cooled. The extruded material exits from the extruder through a round strand nozzle at a temperature of approximately 100° C. and, after a subsequent cooling by air, can be granulated. The granular material has a residual moisture contents, required for further processing, of 6–10% by weight (gravimetric determination, infrared drying at 120° C., 15 minutes drying time).

The granular material is suitable for further processing to tubular film. For this purpose, it is re-extruded with the above-mentioned extruder at a maximum cylinder temperature of 130° C. and is then shaped by an annular nozzle (diameter of 25 mm) to a tubular shape. The tubular shape is then blown to two to three times its diameter. Moreover, two examples with drawn sheet foils are provided in the table for comparison.

The quality of the starch polymer blend is determined with regard to resistance to water and tensile strength according to the following procedures.

Strand samples of approximately 2 cm length are stored 24 hours in water at room temperature; subsequently, the surface water is removed with filter paper and the samples are weighed for determining the water absorption property (moisture expansion). These samples are dried subsequently for 8 hours at 90° C. in a heating chamber and are weighed. Taking into consideration the moisture content of the original samples, which has been determined on simultaneously dried comparative examples free of moisture expansion, the mass loss and the product proportion soluble in cold water can be determined.

For the tensile tests, specimens in the form of a dumbbell are stamped out of the foil in the extrusion direction and are conditioned 48 hours in an atmosphere which will be generated in a closed container above an 80% glycerin/water mixture at room temperature.

The tensile test is carried out with a ZWICK-Universalprüfmaschine (ZWICKI 1120) in accordance with DIN 53 455. The tensile stress at break, stretch at break, and the modulus of elasticity are employed for evaluation purposes.

The hydrolyzed component is produced by saponification of an aqueous polyvinyl acetate dispersion with NaOH at 120–140° C.

To the mixture 12.5% glycerin, relative to the total weight, are added. The percentages of the component and of Bionolle are provided in the following table. The values are based on 100% by weight of the mixture without glycerin. The proportion of the native starch is calculated based on the difference to 100% (also without glycerin).

The table shows that foils with a reduced thickness (approximately 30 $\mu$m) can be produced. In all examples it was found that the processing properties had been improved significantly. The mechanical properties of the foils, increased tensile strength, stretching ability, etc., are significantly improved.

According to a further embodiment, native starch, glycerin as a plasticizer for the starch, the hydrolysis component on PVAc basis, and a starch acetate/PEG blend Sconacell A in the presence with addition of an acidic catalyst ($HNO_3$) were extruded by means of a double screw extruder with screws rotating in the same direction. The obtained polymer blend was re-extruded and processed to a tube film.

In the following table the properties of the produced tube film, one produced with and one produced without catalyst addition, are illustrated.

| Ex. | Compatibility Agent (%) | Sconacell A (%) | catalyst | catalyst proportion (%) | thickness (μm) | $\rho_{max}$ (MPa) | $\epsilon_{max}$ (%) | tensile module (MPa) |
|---|---|---|---|---|---|---|---|---|
| 15 | 33.5 | 30 | — | — | 80–110 | 11.1 | 10 | 1323 |
| 16 | 33.5 | 30 | HNO$_3$ | 0.1 | 60–80 | 14.9 | 7 | 1530 |

It is demonstrated that the tensile strengths of the films are increased when an acidic catalyst is added in the first extrusion step.

Table with Various Examples

| Examples | Compatibility Agent (%) | Bionolle #3001 [%] | catalyst | proportion [%] | foil thickness [μm] | $\rho_{max}$ (MPa) | $\epsilon_{break}$ [%] | tensile module (MPa) |
|---|---|---|---|---|---|---|---|---|
| 1 (sheet foil) | — | 30 | — | 0 | 200–300 | 8.7 | 55 | 128 |
| 2 | — | 30 | — | 0 | 70–120 | 9.4 | 61 | 74 |
| 3 (sheet foil) | — | 30 | TPP | 1 | 200–300 | 8.6 | 71 | 95 |
| 4 | — | 30 | TPP | 1 | 70–100 | 12.0 | 23 | 301 |
| 5 | 33.5 | 30 | — | 0 | 30–90 | 14.5 | 130 | 174 |
| 6 | 33.5 | 30 | TPP | 1 | 45–60 | 18.4 | 167 | 293 |
| 7 | 33.5 | 30 | Tyzor TOT | 1 | 30–40 | 17.0 | 102 | 119 |
| 8 | 33.5 | 30 | HNO$_3$ | 0.1 | 40–50 | 21.1 | 120 | 248 |
| 9 | 33.5 | 30 | H$_2$SO$_4$ | 0.2 | 50–90 | 17.4 | 121 | 218 |
| 10 | 33.5 | 30 | HCl | 0.2 | 30–60 | 16.6 | 124 | 251 |
| 11 | 33.5 | 30 | p-TSS | 0.1 | 40–60 | 21.4 | 119 | 367 |
| 12 | 33.5 | 30 | HNO$_3$ | 0.1 | 40–50 | 19.7 | 110 | 259 |
| 13 | 27.5 | 30 | HNO$_3$ | 0.1 | 35–45 | 19.9 | 83 | 322 |
| 14 | 30 | 25 | HNO$_3$ | 0.1 | 35–50 | 20.5 | 67 | 336 |

TPP . . . triphenyl phosphite
Tyzor TOT . . . tetra-2-ethylhexyl titanate
p-TSS . . . p-toluene sulfonic acid

What is claimed is:

1. A thermoplastic polymer blend comprising a thermoplastic starch, at least one synthetic polymer, hydrolyzed polyvinyl acetate (PVAc) saponified to a hydrolysis degree of 20 to 70%, and an acidic catalyst, wherein the starch component of the polymer blend has a molecular weight which is only minimally reduced relative to native starch, wherein the thermoplastic polymer blend has a bi-continuous phase structure.

2. The thermoplastic polymer blend according to claim 1, comprising extending agents, filling agents, internal lubricants, flow-improving agents, dyes, pigments, or mixtures thereof.

3. The thermoplastic polymer blend according to claim 1, comprising, relative to the total composition of the polymer blend, 30–70% by weight of the thermoplastic starch, 20–40% by weight of the synthetic polymer, and 6–25% by weight of the hydrolyzed PVAc.

4. The thermoplastic polymer blend according to claim 1, wherein the synthetic polymer is a biologically degradable aliphatic polyester or a polyester copolymer or polyvinyl acetate or a polyvinyl acetate copolymer or a water-resistant starch derivative or a water-resistant cellulose derivative or polyvinyl alcohol or a polyvinyl alcohol copolymer.

5. A method for producing a thermoplastic polymer blend by reactive extrusion, the method comprising the steps of:

a) mixing native starch, at least one hydrophobic polymer, a hydrolyzed polyvinyl acetate (PVAc) saponified to a hydrolysis degree of 20 to 70%, and at least one of lower polyfunctional alcohols and water; and b) adding an acidic catalyst to the mixture of step a) and extruding the mixture in the presence of the acidic catalyst.

6. The method according to claim 5, wherein the acidic catalyst is an organometallic compound selected from the group consisting of dibutyl tin oxide, dibutyl tin dilaurate, tetra-2-ethylhexyl titanate, triethanolamine zirkonate, titanate compound chelated with lactic acid, triethanolamine titanate, and alkyl titanate.

7. The method according to claim 6, wherein the mixture comprises 0.5% to 2% of the acidic catalyst, relative to the total weight of the mixture.

8. The method according to claim 5, wherein the acidic catalyst is a Lewis acid.

9. The method according to claim 8, wherein the mixture comprises 0.5% to 2% of the acidic catalyst, relative to the total weight of the mixture.

10. The method according to claim 5, wherein the acidic catalyst is an acid selected from the group consisting of nitric acid, sulfuric add, hydrochloric acid, and p-toluene sulfonic acid.

11. The method according to claim 10, wherein the mixture comprises 0.05 to 0.2% of the acidic catalyst, relative to the total weight of the mixture.

12. The method according to claim 5, wherein the polyvinyl acetate is saponified to a hydrolysis degree of 30% to 55%.

13. The method according to claim 5, wherein the polyvinyl acetate is prepared as an aqueous dispersion and is saponified at 120–140° C. with sodium hydroxide.

14. The method according to claim 5, further comprising the step of adjusting the hydrolyzed polyvinyl acetate basis to a residual moisture contents of 15–35%.

15. The method according to claim 5, wherein in the step a) the native starch, the hydrolyzed polyvinyl acetate, and the catalyst are mixed to a well-flowing powder mixture.

16. The method according to claim 15, wherein approximately 1% stearic acid, relative to the total weight of the powder mixture, is added to the powder mixture.

17. The method according to claim 15, wherein approximately 1% silica gel, relative to the total weight of the powder mixture, is added to the powder mixture.

18. The method according to claim 5, wherein the acidic catalyst is metered in a liquid state mixed with glycerin.

* * * * *